(12) United States Patent
Suraparaju et al.

(10) Patent No.: US 9,189,736 B2
(45) Date of Patent: Nov. 17, 2015

(54) METHOD AND SYSTEM FOR PROCESSING INCOMPATIBLE NUI DATA IN A MEANINGFUL AND PRODUCTIVE WAY

(71) Applicants: Rajesh Babu Suraparaju, Chennai (IN); Apparao Jappani, Chennai (IN); Krishna Bharat, Chennai (IN)

(72) Inventors: Rajesh Babu Suraparaju, Chennai (IN); Apparao Jappani, Chennai (IN); Krishna Bharat, Chennai (IN)

(73) Assignee: HCL Technologies Limited, Chennai, Tamil Nadu (IN)

( * ) Notice: Subject to any disclaimer, the term of this patent is extended or adjusted under 35 U.S.C. 154(b) by 279 days.

(21) Appl. No.: 13/849,446

(22) Filed: Mar. 22, 2013

(65) Prior Publication Data

US 2014/0289169 A1    Sep. 25, 2014

(51) Int. Cl.
G06F 17/00     (2006.01)
G06N 5/02      (2006.01)
G06F 9/44      (2006.01)
G06F 3/048     (2013.01)
G06N 5/04      (2006.01)
G06N 99/00     (2010.01)

(52) U.S. Cl.
CPC ........ *G06N 5/02* (2013.01); *G06F 3/048* (2013.01); *G06F 9/44* (2013.01); *G06F 9/4443* (2013.01); *G06N 5/04* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 6,725,217 B2 * | 4/2004 | Chow et al. | 707/706 |
| 2008/0273088 A1 * | 11/2008 | Shu et al. | 348/154 |
| 2011/0206198 A1 * | 8/2011 | Freedman et al. | 379/265.03 |
| 2011/0296352 A1 * | 12/2011 | Lobb | 715/848 |

* cited by examiner

*Primary Examiner* — Kakali Chaki
*Assistant Examiner* — Ababacar Seck

(57) ABSTRACT

A method and system for processing incompatible NUI data in a meaningful and productive way. An NUI system capable of combining NUI events from multiple NUI devices and producing a standardized output is described. NUI adaptors covert low level input data into high-level NUI events. These events are stored in a repository. A behavioral analysis engine makes use of the stored NUI events and produces a combined output for users making use of behavioral pattern rules. The behavioral analysis engine also makes use of NUI events for training the system to create and utilize new pattern rules.

10 Claims, 4 Drawing Sheets

METHOD AND SYSTEM FOR PROCESSING INCOMPATIBLE NUI DATA IN A MEANINGFUL AND PRODUCTIVE WAY

The present application claims priority from Indian Application Number 1093/CHE/2012, filed on 23 Mar. 2012, the disclosure of which is hereby incorporated by reference herein.

TECHNICAL FIELD

This embodiment relates to natural user interfaces and systems accessible via computer applications, and more particularly to a method of analyzing and interpreting data from multiple natural user interfaces devices.

BACKGROUND

One of the major advances in digital technology is the emergence of Natural User Interfaces (NUI), which allow users to make use of technology without needing special training or knowledge. A NUI is a system that enables human-computer interaction so that the user operates through intuitive actions such as gestures, speech, natural motions, expressions, eyesight movements and so on. There are multiple NUI technologies being developed like Multi-touch, speech inputs, gestural inputs, augmented reality, behavioral analysis and interpretation and so on.

Although each NUI technology enhances user interface with computing and provides a definite output, a combination of the NUI technologies in a combined NUI will allow users to take advantage of benefits from various NUI technologies simultaneously. Consider an example of monitoring a patient. A frantic waving of hands recognized by a gesture recognition device, combined with the recognition of the words 'Pain', or 'Not able to breathe' with the help of a speech recognition solution can provide a reasonably accurate alarm for a heart attack victim.

However combining these NUI technologies to form a single NUI is complicated and has some issues. Generally, different companies develop NUIs and depending on the preference of the company providing the technology, the core programming platform used by the companies may differ. This may lead to issues related to platform compatibility and interoperability when trying to combine various NUIs. Also the same technology manufactured by two different companies differs in specification and performance. Further, data from different NUIs cannot be correlated.

BRIEF DESCRIPTION OF FIGURES

This embodiment is illustrated in the accompanying drawings, throughout which reference letters indicate corresponding parts in the various figures. The embodiments herein will be better understood from the following description with reference to the drawings, in which.

DETAILED DESCRIPTION OF EMBODIMENT

Figure 1:
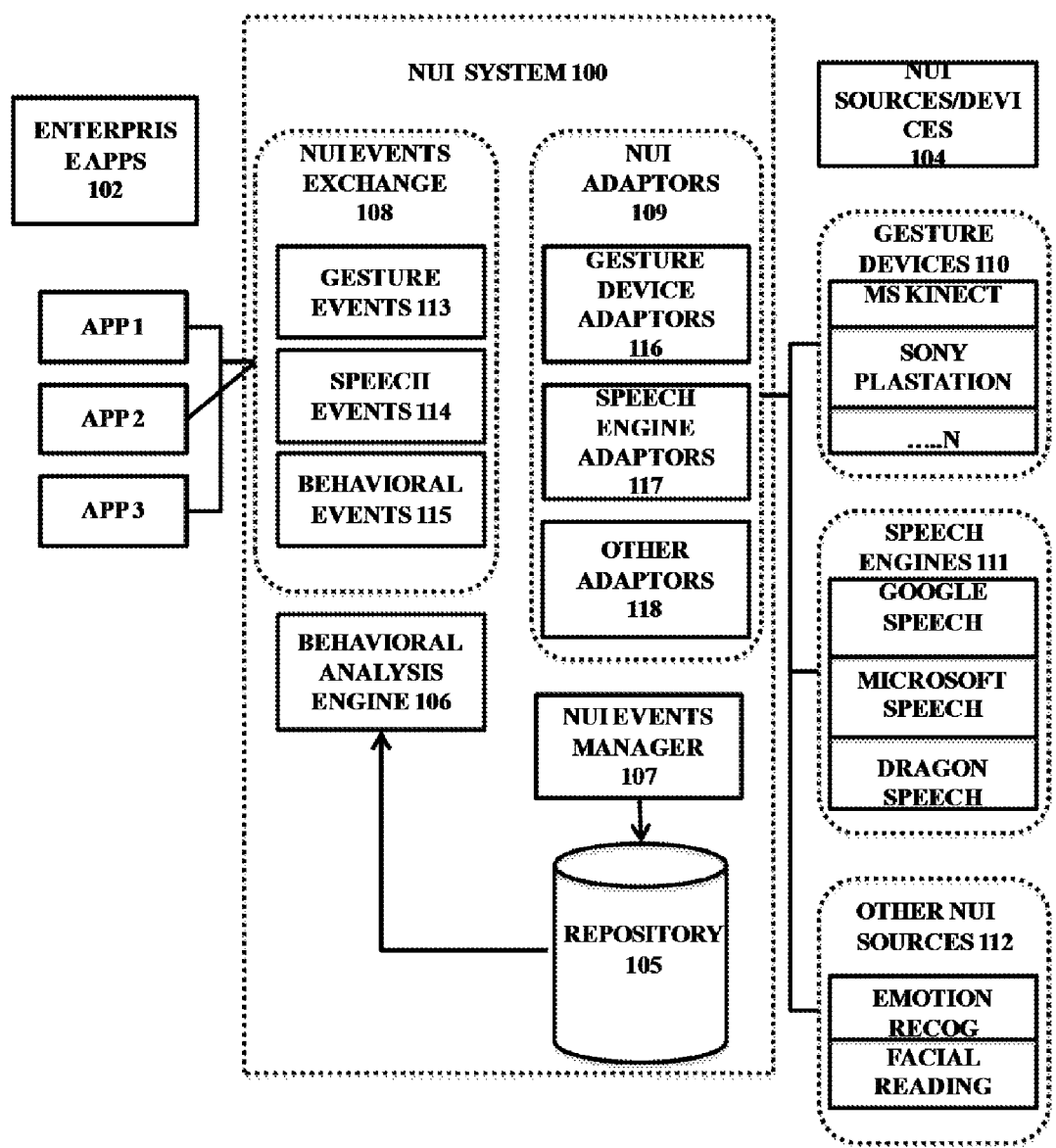
FIG. 1 illustrates a natural user interface NUI system, according to the embodiments as disclosed herein.

The embodiments herein, the various features, and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The principal object of this embodiment is to provide a Natural User Interfaces (NUI), which can combine data from various NUI devices/systems to produce a meaningful output. Another object of the embodiment is to provide a standard data structure for representing all natural user interface events data to ensure interoperability of data generated by different NUI devices/systems. Another object of the embodiment to provide a repository for storing NUI events from various sources. A further object of the embodiment is to provide complex behavioral interpretation of NUI events stored in a repository for real time training of system. Referring now to the drawings, and more particularly to FIGS. 1 through 4, where similar reference characters denote corresponding features consistently throughout the figures, there are shown preferred embodiments.

FIG. 1 illustrates a natural user interface NUI system, according to the embodiments as disclosed herein. The NUI system 100 comprises of an NUI events exchanger 108, a behavioral analysis engine 106, NUI adaptors 109, a NUI events manager 107 and a repository 105. The repository 105 stores all transformed NUI events from the NUI adaptors 109 and also helps in analysis as well as providing a history of interactions. The NUI system receives input from various NUI sources and devices 104. The input NUI sources 104 include gesture devices 110, speech engines 111 and other sources 112. At least one gesture device 110 tracks gestures and body movements. Some common gesture devices include Kinect, PlayStation and various other camera based devices. Each of these devices provides events in low data in their own propriety format. Speech engines 111 include devices like Google speech engine, Dragon speech recognition, Microsoft speech recognition and so on. All the speech engines 111 provide access to their core functionality through their propriety data. In the case of the cloud based speech engines, the output has to be processed for deriving semantic information to generate specific NUI events through custom developed semantic interpreters complying with relevant standards. Other NUI sources 112 may include devices for emotion recognition, facial reading and so on. Other NUI sources 112 may include devices for emotion recognition, facial reading and so on.

Low level events occurring at the input NUI sources/devices 104 are received by the NUI adaptors 109. The NUI adaptors 109 converts the low level inputs into standardized high level input NUI events. These NUI events represent the transformed NUI events aggregated from the individual NUI devices 104, as well the higher level events interpreted by embodiments disclosed herein. These will be available to the subscribing enterprise applications. The NUI events manager 107 then stores these high level input events into the repository 105. The gesture device adaptors 116 connect, extract and convert the input source data into a form that can be used for deriving NUI event information. Speech engine adaptors 117 provide access to their core functionality through their own proprietary formats. In the case of the cloud based speech engines, the output has to be processed for deriving semantic information to generate specific NUI events through custom developed semantic interpreters complying with relevant standards. When the NUI sources include emotion recognition device, emotion-sensing adaptors can either directly accept interpreted emotion information of subjects from solutions or parse video streams from cameras for deriving emotion information. The NUI events manager 107 receives events from all the adaptors and stores them in the repository. An NUI events exchange 108 stores NUI events from each adaptor separately. The NUI events from gesture device adaptors 116 are stored as gesture events, speech engine adaptor events 117 are stored as speech events and the other adaptor outputs are stored as behavioral events 115. All the events stored as per NUI source/device can be accessed by enterprise application 102.

Figure 2:
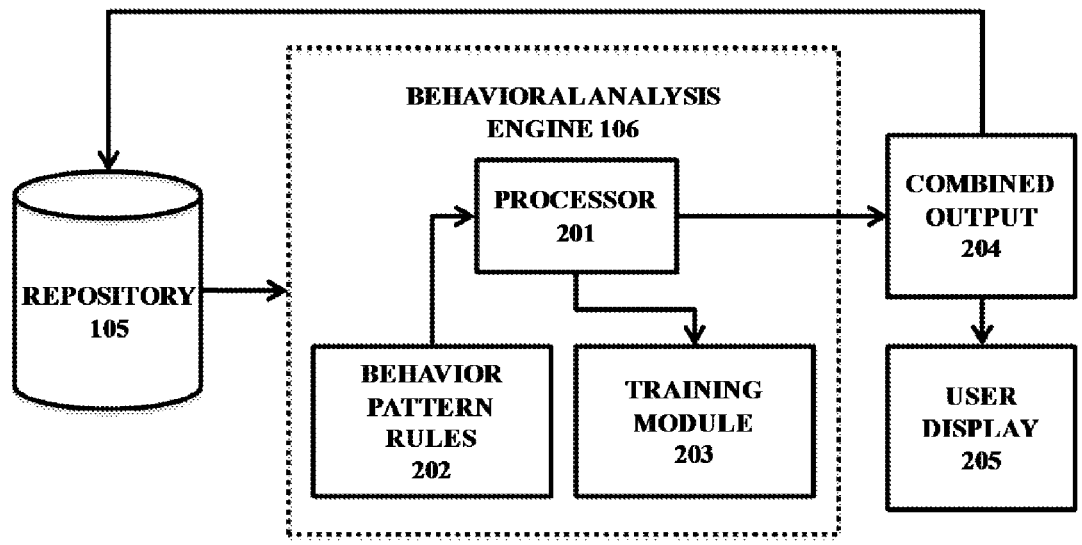
FIG. 2 illustrates components of an behavioral analysis engine, according to the embodiments as disclosed herein.

FIG. 2 illustrates components of a behavioral analysis engine, according to the embodiments as disclosed herein. The behavioral analysis engine 106 is the heart of the NUI system 100. The behavioral analysis engine 106 comprises of a processor 201, behavior pattern rules 202 and training module 203. The behavioral analysis engine 106 receives input from the repository 105. The processor 201 receives all the NUI events from the repository at pre-defined intervals. The pre-defined interval may be scheduled as needed or as required by application of the NUI system. The processes compares received NUI events with the behavioral pattern rules 202 and produces a combined output 204. The combined output is then sent to the user display device 205. In case where the processor encounters NUI events which are different from behavioral pattern rules 202, the NUI events output are sent to the combined output 204 along with the training module 203. The training module 203 collects new NUI events and creates new behavioral pattern rules 202. The training module 203 has capability to train the device to understand and recognize new NUI event interactions, which are a composite of the individual NUI event interactions, though an interface allowing specification of rules.

Figure 3:
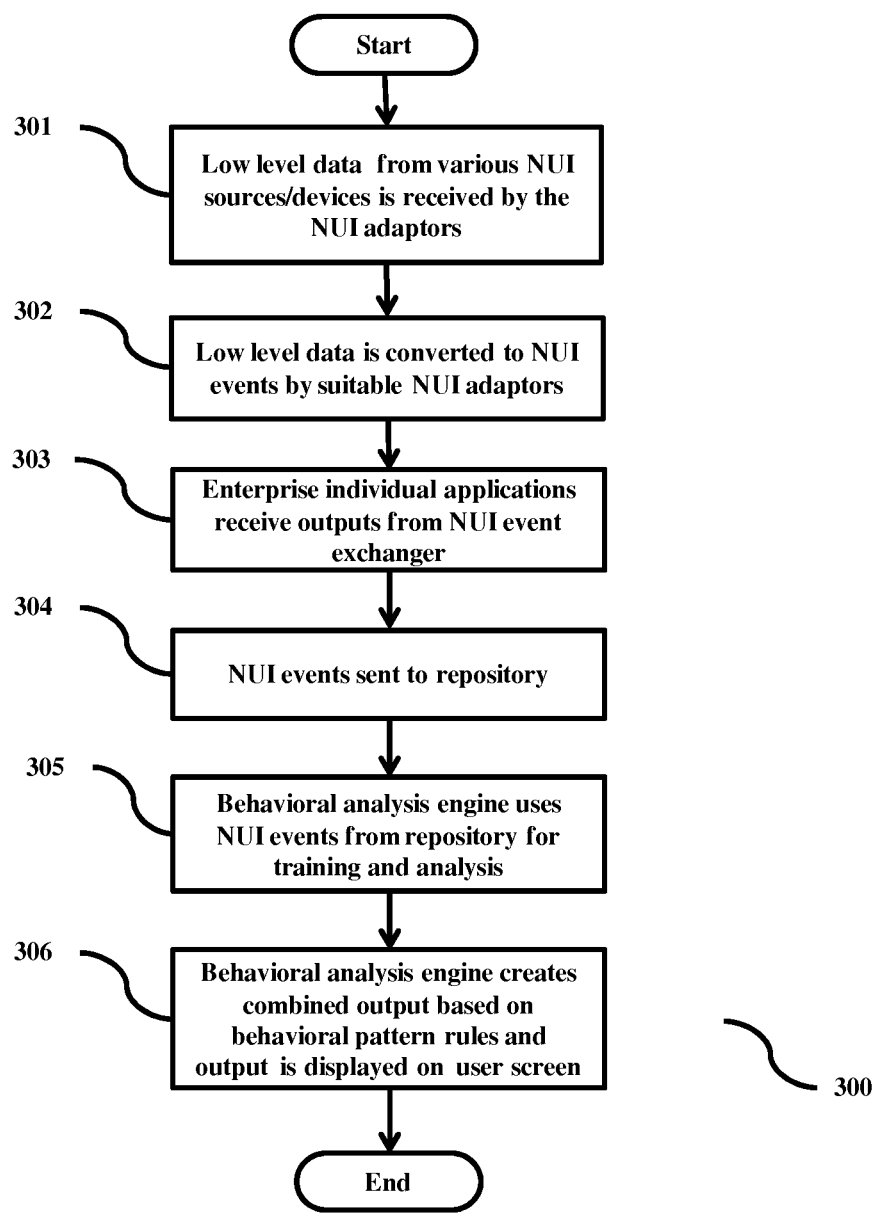
FIG. 3 is a flowchart describing the information flow in the natural user interface NUI system, according to the embodiments disclosed herein.

FIG. 3 is a flowchart describing the information flow in the natural user interface NUI system, according to the embodiments disclosed herein. Low-level input data from various NUI sources/devices 104 is received (301) by the NUI adaptors 109. The low level input data is then converted (302) to NUI events by the appropriate NUI adaptors 109. Enterprise individual applications 102 may receive (303) outputs from NUI event exchanger 108. The NUI events are then sent (304) to the repository 105 by the NUI events manager 107. The behavioral analysis engine 106 uses NUI events from repository 105 for training and analysis. Behavioral analysis engine 106 creates (306) a combined output 204 based on behavioral pattern rules 202 and output is displayed on user display 205. The various actions in method 300 may be performed in the order presented, in a different order or simultaneously. Further, in some embodiments, some actions listed in FIG. 3 may be omitted.

Figure 4:
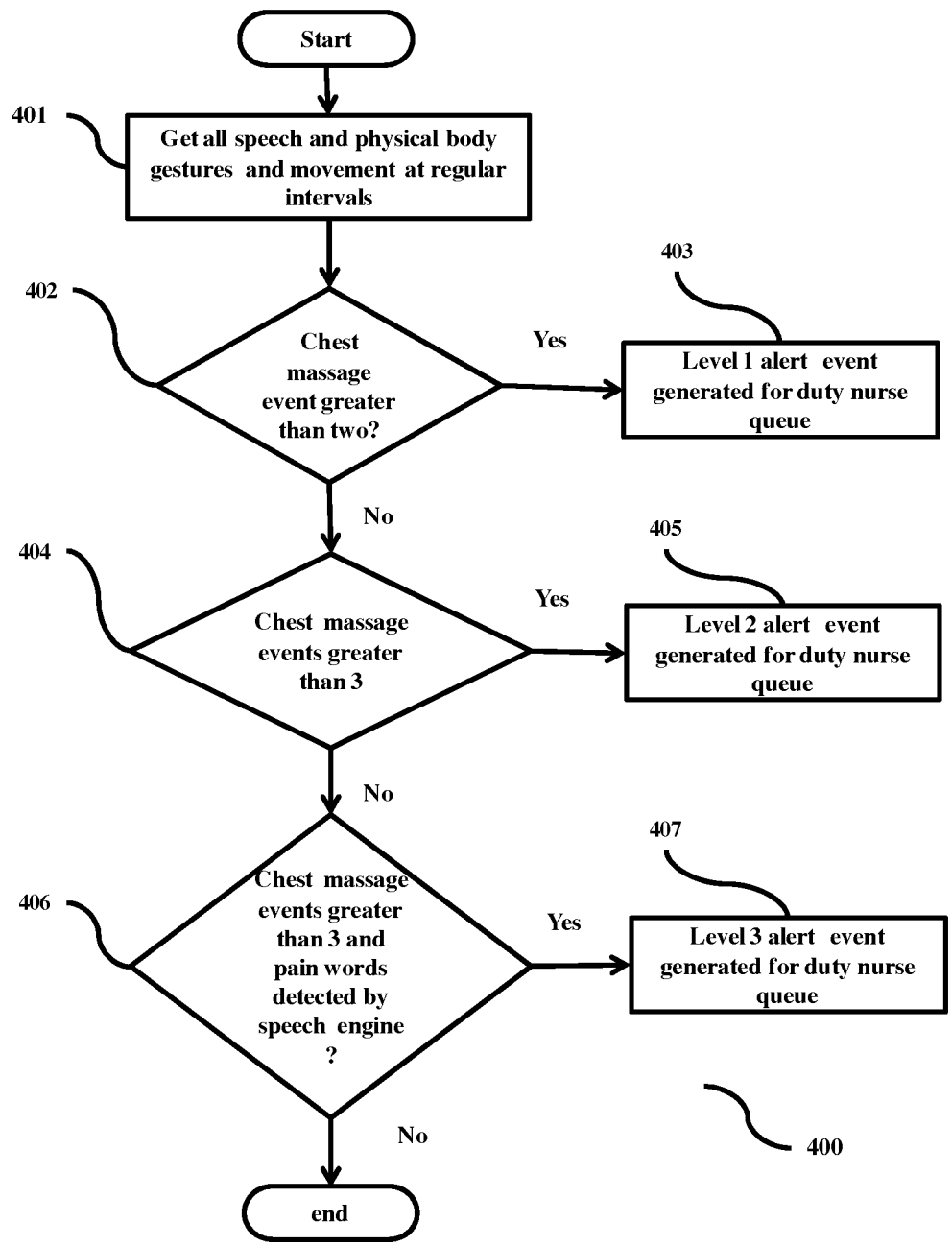
FIG. 4 is an example flowchart illustrating working of the behavioral analysis engine, according to the embodiments disclosed herein.

FIG. 4 is an example flowchart illustrating working of the behavioral analysis engine, according to the embodiments disclosed herein; and. This example illustrates the use of a NUI system 100 in a hospital environment for detecting heart problems in patients. The NUI system 100 receives (401) speech and physical body gestures and movement at pre-defined intervals from NUI sources/devices 104. The intervals can be set as required by the situation. These received gesture and movement events are transformed into NUI events by appropriate NUI adaptors 109. The processor 201 of the behavioral analysis engine 106, checks (402) if more than two NUI events of chest massage have occurred. If the patient is found to be massaging his chest twice in the pre-defined interval then a level 1 alert event (403) is generated for duty nurse queue. The processor 201 then checks (404) if the patient has massaged his chest more than three times in pre-defined interval. If the patient is found to be massaging his chest twice in the pre-defined interval then a Level 2 alert event generated (405) for duty nurse queue. The processor 201 then checks (404) if the patient is massaging his chest more than 3 times in the pre-defined interval and if any pain words are detected (406) by the speech engine. If pain words along with constant chest massaging are detected, a level 3 alert event is generated (407) for duty nurse queue. Based on the alert level, the nurse at duty and can respond to different patients. The various actions in method 400 may be performed in the order presented, in a different order or simultaneously. Further, in some embodiments, some actions listed in FIG. 4 may be omitted.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method for managing data from Natural User Interface (NUI) devices, the method comprising:
   receiving at least an input from at least one of input NUI sources, wherein said input sources include gesture devices, speech engines and behavioral sources;
   converting said input to a specified form by an NUI adapter;
   storing at least an NUI converted input from each adaptor separately an NUI events exchanger;
   receiving said converted input by an NUI events manager;
   storing at least a high level input event into a repository by said NUI events manager; and
   creating a combined output from the converted input and at least one behavior pattern rule by a behaviour analysis engine, said behavior analysis engine comprising said behavior pattern rules and a training module, said training module configured to collect at least one new NUI event and create new behavior pattern rules, further wherein said training module is adapted to train said NUI device to understand and recognize new NUI event interactions.

2. The method, as claimed in claim 1, wherein the method further comprises storing the converted inputs in a repository by a NUI events manager.

3. The method, as claimed in claim 1, wherein the method further comprises displaying the combined output on a user display by the behaviour analysis engine.

4. The method, as claimed in claim 1, wherein the method further comprises updating the behavioural pattern rules based on at least one of the converted inputs by the behaviour analysis engine.

5. The method, as claimed in claim 1, wherein the method further comprises creating the combined inputs at pre-defined intervals behaviour analysis engine.

6. A system for managing data from Natural User Interface (NUI) devices, the system comprising:
- said NUI device configured for receiving at least an input from at least one of input NUI sources, wherein said input sources include gesture devices, speech engines and behavioral sources;
- an NUI adapter configured for converting said input to a specified form;
- an NUI events exchanger configured for storing at least an NUI converted input from each adaptor separately;
- an NUI events manager configured for receiving said converted input;
- said NUI events manager further configured for storing at least a high level input event into a repository; and
- a behaviour analysis engine configured for creating a combined output from the converted input and at least one behavior pattern rule, said behavior analysis engine comprising said behavior pattern rules and a training module, said training module configured to collect at least one new NUI event and create new behavior pattern rules, further wherein said training module is adapted to train said NUI device to understand and recognize new NUI event interactions.

7. The system, as claimed in claim 6, wherein the NUI adapter is further configured for storing the converted inputs in a repository.

8. The system, as claimed in claim 6, wherein the behaviour analysis engine is further configured for displaying the combined output on a user display.

9. The system, as claimed in claim 6, wherein the behaviour analysis engine is further configured for updating the behavioural pattern rules based on at least one of the converted inputs.

10. The system, as claimed in claim 6, wherein the behaviour analysis engine is further configured for creating the combined inputs at pre-defined intervals.

* * * * *